(12) United States Patent
De Luca

(10) Patent No.: US 8,870,272 B2
(45) Date of Patent: Oct. 28, 2014

(54) FLOOR MODULE FOR A MOTOR VEHICLE HAVING SHAPED-ON FORMFITTING MEANS

(75) Inventor: Fabian De Luca, Luedenscheid (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/421,962

(22) Filed: Mar. 16, 2012

(65) Prior Publication Data

US 2012/0235445 A1 Sep. 20, 2012

(30) Foreign Application Priority Data

Mar. 18, 2011 (DE) .......................... 10 2011 014 338

(51) Int. Cl.
*B62D 25/20* (2006.01)
*B62D 27/02* (2006.01)
*B62D 27/00* (2006.01)

(52) U.S. Cl.
CPC ............ *B62D 25/20* (2013.01); *B62D 25/2036* (2013.01); *B62D 27/026* (2013.01)
USPC .............. 296/193.07; 296/184.1; 296/187.08; 296/193.04

(58) Field of Classification Search
USPC .................. 296/193.04, 193.07, 204, 203.01, 296/184.1, 187.08
See application file for complete search history.

(56) References Cited

U.S. PATENT DOCUMENTS

| 5,129,700 A | 7/1992 | Trevisan et al. |
| 5,765,906 A | 6/1998 | Iwatsuki et al. |
| 2002/0027368 A1 | 3/2002 | Volz et al. |
| 2009/0195029 A1 | 8/2009 | Paschek et al. |

FOREIGN PATENT DOCUMENTS

| DE | 2923874 A1 | 1/1981 |
| DE | 3011386 A1 | 10/1981 |
| DE | 3011428 A1 | 10/1981 |
| DE | 3801337 A1 | 8/1989 |
| DE | 69013478 T2 | 2/1995 |
| DE | 102008007300 A1 | 8/2009 |
| JP | 5024563 A | 2/1993 |

OTHER PUBLICATIONS

UK IPO, British Search Report for Application No. 1204513.4, dated Jun. 27, 2012.
German Patent Office, German Search Report for Application No. 102011014338.6, dated Jan. 10, 2012.

*Primary Examiner* — Glenn Dayoan
*Assistant Examiner* — Melissa A Black
(74) *Attorney, Agent, or Firm* — Ingrassia Fisher & Lorenz, P.C.

(57) ABSTRACT

A floor module for a motor vehicle having a floor trough, which has, in the area of at least two side edges, at least one contact surface in each case for supporting the floor trough on a support structure component of a motor vehicle body and at least one formfitting device shaped onto the floor trough, by which the floor trough is at least temporarily fastenable on the support structure component.

20 Claims, 3 Drawing Sheets

FLOOR MODULE FOR A MOTOR VEHICLE HAVING SHAPED-ON FORMFITTING MEANS

CROSS-REFERENCE TO RELATED APPLICATION

This application claims priority to German Patent Application No. 10 2011 014 338.6, filed Mar. 18, 2011, which is incorporated herein by reference in its entirety.

TECHNICAL AREA

The technical field relates to a floor module for a motor vehicle having a floor trough, which, in the area of at least two side edges, has a support surface in each case for support on one, preferably on multiple support structure components of a motor vehicle body.

BACKGROUND

The floor structure of the motor vehicle, in particular the rear floor structure, typically has two longitudinal girders, which are spaced apart from one another in the vehicle transverse direction and each extend essentially in the vehicle longitudinal direction, and which are connected to one another via one or more crossbeams. At least one floor trough is arranged between the longitudinal girders, which fill up the intermediate space between the supporting structural components of the motor vehicle body.

For example, a vehicle body having a fastening device for attaching a floor trough to the vehicle frame is known from DE 690 13 478 T2. This fastening device has a continuous fastening surface, which is obtained on three sides of the floor. Furthermore, it comprises a number of metal bolts, which are each seated on a lower surface of the floor and are attached by screw fastenings to side parts and a rear transverse part. A layer of an elastic adhesive is arranged between the continuous fastening surface and lower surfaces of the side parts and the rear transverse part and between the floor trough and the metal bolts.

The use of adhesives both for connecting metal parts and also metal-hybrid parts and plastic parts is increasingly employed in the automotive field. However, in an installation aspect, an adhesive bond always requires the components to be connected to one another to be fixed in relation to one another at least over the duration of the adhesive curing, possibly even under pressure action. Typical fixations, as are also described, for example, in DE 690 13 478 T2 on the basis of threaded bolts and similar fasteners, are accompanied with a substantial installation and fixation effort, however. A mechanically over determined connection of individual parts is also provided in this way.

In view of the foregoing, at least one object is to provide an attachment of a floor module, to support structure components of a motor vehicle, which is particularly efficient to manufacture. The attachment preferably provides a much simple, intuitive, and easy implementation of fixing parts to be glued to one another. In addition, at least another object is to minimize manufacturing, installation, and/or material expenditure. Furthermore, at least one object is to reduce vehicle weight. Moreover, other objects, desirable features and characteristics will become apparent from the subsequent summary and detailed description, and the appended claims, taken in conjunction with the accompanying drawings and this background.

SUMMARY

The floor module according to an embodiment provides for a motor vehicle and has a floor trough, which has a contact surface in each case in the area of at least two side edges for supporting the floor trough on a support structure component of a motor vehicle body. The floor module or its floor trough advantageously has multiple contact surfaces, which come into a contact position with corresponding counter contact surfaces of the vehicle-body-side support structure components upon reaching a final installation position on the motor vehicle.

In addition, the floor module has at least one formfitting device shaped onto the floor trough, with which the floor trough is at least temporarily fastenable on the support structure component or on the support structure components. Since the at least one, preferably multiple formfitting means are shaped directly onto the floor trough, the use of further separate fasteners for the fixation of the floor trough on the vehicle-body-side support structure components can effectively be omitted.

The formfitting device shaped onto the floor trough is to be understood as any non-removable connections, in particular integral or materially bonded connections, of floor trough and formfitting means. Thus, in particular, it can be provided that the at least one formfitting device is fastened on the floor trough in a separate work step before final installation of the floor trough on the motor vehicle. This can be performed in particular by a material-bonding connection method, for example, by welding or gluing, and particularly by ultrasonic welding in the case of an implementation in plastic.

It is provided in particular that the floor module is fastenable by gluing via its contact surface and via an adhesive to be applied thereon to the support structure component or components of the vehicle body, and the formfitting means shaped onto the floor trough provide a fixation of the floor module in relation to the support structure component for the duration of the adhesive curing.

With curing of the adhesive to be introduced between a contact surface and counter contact surface, the formfitting device shaped onto the floor trough and its formfitting connection to the support structure component can effectively be dispensed with. The formfitting device therefore only fulfills a temporary and transient function. It must also only be designed to hold the floor trough and for its weight force. Specifically, the actual fastening of the floor trough to the vehicle body for the later operation of the motor vehicle is performed predominantly, if not entirely exclusively, via the adhesive bond.

According to an embodiment, it is provided in particular that the formfitting devices is or are implemented integrally with a side wall of the floor trough. In the same way, the at least one contact surface of the floor trough is also integrally connected to the side wall of the floor trough. In particular, the contact surface can form an outwardly protruding edge of the side wall of the floor trough, which is implemented like a flange, for example. Furthermore, the formfitting device can advantageously be implemented as a detent element. In particular, it can interact by latching with corresponding counter detent elements or with suitable projections or undercuts of the support structure component for fixation and installation purposes without the aid of any tools.

It has proven to be particularly advantageous if, according to an embodiment, the floor trough and the formfitting device are implemented from plastic. The floor module, i.e., the floor trough having the formfitting device shaped thereon, can be implemented as an injection-molded part and can comprise a fiber-reinforced thermoplastic or duroplastic plastic. Thermoplastic elastomers, such as polypropylene (PP), but also polyamide (PA), in particular unsaturated polyester resins (UP) can be used. In addition to injection-molded parts, plastic molded parts and fiber-reinforced plastics can also be used. The contact surface to be provided with the adhesive can also be optimized for the adhesion of adhesives, e.g., by oxidation or another type of processing.

By using a plastic floor module, on the one hand, the vehicle weight can be reduced in relation to an implementation in metal. On the other hand, the plastic implementation allows direct integration of the formfitting device in or on the floor trough, i.e., the formfitting device provided for the fixation of the floor trough on the support structure components does not have to be fastened separately to the floor trough. It may be shaped onto the floor module in a nearly cost-neutral manner in the production process thereof, and can therefore be integrated into the floor module, which is preconfigured for installation on the motor vehicle.

Furthermore, it is provided that the formfitting device and the contact surface of the floor trough are adapted to one another or geometrically implemented for one another in such a manner that the contact surface provided with an adhesive or with an adhesive layer comes into a contact position on the bottom side of a counter contact surface corresponding thereto of the vehicle-body-side support structure component when the formfitting device forms a formfitting connection with a top side of this counter contact surface on the support structure side.

The contact surface of the floor trough, which is provided with an adhesive layer or adjoins the support structure component from below via an adhesive layer, can be fixed with a formfitting device that cooperates with the opposing top side of the counter contact surface. It is even conceivable for this purpose that the formfitting device generates or maintains a contact pressure force between the contact surface and the counter contact surface, which promotes the curing of the adhesive.

According to an embodiment, the formfitting device can be implemented in extension of a side wall of the floor trough and can protrude from the contact surface. Furthermore, it is conceivable in this case that the formfitting device is integrated quasi-flush with the surface into the side wall of the floor trough, but the contact surface of the floor trough extends outward somewhat below the upwardly protruding free end section of the formfitting device.

It is particularly provided in this case that the formfitting device is implemented as a flexible detent hook. The detent hook can have an intake bevel and, adjoining thereon, an undercut to form a detent connection with the counter contact surface of the vehicle body. The contact surface and the detent hook form a receptacle corresponding to the material thickness and the adhesive layer thickness.

The floor trough can be clipped in a flexible manner onto the support structure component of the motor vehicle body with a flexibly implemented detent hook. A clip connection can be achieved between detent hook and counter contact surface of the support structure components. However, the implementation of corresponding counter detent means on the side of the vehicle body is alternately also conceivable.

Furthermore, according to an alternative design, it can be provided that the formfitting device is implemented as a detent device protruding in the plane of the contact surface and passage openings of the counter contact surface are provided arranged corresponding to the position of the detent device. The detent device, which protrudes from the contact surface and extends approximately parallel to the surface normal of the contact surface, can penetrate the passage openings provided for this purpose of the counter contact surface to form a detent connection.

Independently of a concrete geometric design of the detent device, it can always provide a type of positioning and centering aid for the installation process with a beveled surface. The intake bevel, which is implemented on a detent hook or detent dome, can cause precisely fitted positioning, in particular a displacement of the floor trough perpendicularly to the installation direction. In this design, it is provided in particular that the detent device unfolds radially outward against a tensioning force to be applied externally, in order to be able to form a form fit, which supports the adhesive bond of the adhesive, with the passage opening to be penetrated of the counter contact surface.

In a refinement thereof, it is thus provided in particular that the detent device is implemented like a mushroom-head pin or detent dome having a number of segments deformable in the radial direction. The individual segments of the pin can be separated from one another by corresponding slots for this purpose, which allow deflection of the pin segments perpendicularly to the surface normal of the contact surface. The pin, or its individual segments, can also have a tapering or pointed contour having a beveled surface toward its free end sections, so that upon insertion of the pin into the vehicle-body-side passage opening provided for this purpose, the pin is already compressed sufficiently in such a manner that the individual segments can pass through the passage opening and can form a form fit with the counter contact surface after spreading out radially.

If detent device or formfitting device is implemented as a mushroom-head pin, corresponding passage openings are to be provided on the counter contact surface of the vehicle-body-side support structure component. If the floor-module-side detent device is designed like a detent hook, it would already be sufficient if the vehicle-body-side support structure component had a profile corresponding to the detent hook in the area of its counter contact surface.

Independently of the number and shaping of individual formfitting device, it has proven to be advantageous according to another embodiment if the contact surface completely encloses the side wall of the floor trough at least along three side edges. It is provided in particular that the contact surface is implemented on side edges of the floor trough located in the vehicle transverse direction, so that the floor module can be supported on the longitudinal girders of the vehicle body, which are spaced apart from one another in the vehicle transverse direction and each extend essentially in the vehicle longitudinal direction, and can be fastened thereon by means of an adhesive.

To the front and to the rear, i.e., facing in the travel direction and also opposite to the travel direction, the side wall of the floor trough can have corresponding contact surfaces, in order to be able to arrange the floor module, for example, also on crossbeams of the vehicle body, which are spaced apart from one another in the vehicle longitudinal direction and extend essentially in the vehicle transverse direction.

In an embodiment, the formfitting device can have at least one intended breakpoint, which makes it easier to remove the formfitting device after curing of an adhesive, or defines a break-off point, along which the formfitting device is removed, e.g., for reasons of space and to enlarge the installation space to be provided.

Furthermore, according to an embodiment, a floor arrangement of a motor vehicle is provided, which has at least two support structure components, which are arranged at a distance from one another and are preferably aligned parallel to one another. In addition, the floor arrangement has a floor module, which is arranged on the support structure component, having a floor trough, the floor trough being fastenable on the support structure component with an adhesive to be provided between a contact surface on the floor trough side and a counter contact surface on the support structure side, and being fixable with at least one formfitting device shaped onto the floor trough at least until the curing of the adhesive on the mentioned support structure component. The floor module is preferably implemented in this case as a plastic component or as a plastic injection-molded part or as a plastic molded body and is fixed on the support structure component of the motor vehicle body, by which at least one formfitting device shaped onto the floor trough, at least during the curing of the adhesive.

The floor arrangement is preferably implemented as the rear floor arrangement of a motor vehicle, the floor trough being provided as a planar formation located under the cargo floor of the motor vehicle, which is used to accommodate a spare tire, for example, and accordingly has a spare tire trough or similar functional parts, for example, for accommodating and fastening tools to be carried along.

In an embodiment, it is provided in this case that the counter contact surface, using which the contact surface on the floor module side is fixable with one or more adhesive components, is implemented as a fastening flange protruding inward, toward the vehicle center, of a lateral longitudinal girder of the motor vehicle body. The fastening flange, which is aligned inward, toward the vehicle center, and protrudes from the lateral longitudinal girders, advantageously extends along or in extension of the bottom side of the corresponding longitudinal girder.

Since such vehicle body components are often implemented as a hollow chamber profile having closed cross-section and are formed by connecting one or more profile parts, flange sections arise automatically, along which the individual sheet-metal shaped parts forming the support structure component are connected to one another, preferably welded to one another. In the present case, such a flange section extending along the longitudinal girder can function as the counter contact surface to form an adhesive bond with a floor module having a corresponding contact surface.

In a manufacturing aspect, according to an embodiment, a method is provided for installing a floor module having a floor trough on one or more support structure components of a motor vehicle. At least one single-component or multicomponent adhesive is applied in this case to a contact surface on the floor trough side and/or to a counter contact surface corresponding thereto of the support structure component.

After application of an adhesive layer to the contact surface and/or to the counter contact surface, the floor module is connected in a formfitting manner to the support structure component using at least one formfitting device shaped onto the floor trough at least until the curing of the adhesive. The formfitting connection is performed in this case in such a manner that with the formation of the form fit, the surfaces corresponding with one another, namely contact surface and counter contact surface having the interposed adhesive layer, come into the contact position, possibly while maintaining a predefined contact pressure. Since the formfitting device on the floor module side are preferably implemented as detent device or detent hooks, a fixation of the floor trough on the motor vehicle body can also be performed without the aid of installation tools, for example, by simple engagement.

It is provided in particular that the floor module is fastened with the formfitting device on a flange-like counter contact surface of the support structure component at least until the adhesive is cured. If the fastener protruding from the flange plane occupies installation space required in another way in the course of further installation, it can also be removed after curing of the adhesive, for example, broken off. It is even conceivable in this regard to provide the shaped-on formfitting device with an intended breakpoint, for example, to allow controlled and defined breaking off of a formfitting device protruding from the fastening flange.

It can prove to be beneficial if the floor trough implemented in the plastic has a pronounced mechanical anisotropy in the direction of the form fit, in particular in the area of its formfitting device shaped onto the trough wall or edge section. Thus, for example, by corresponding alignment of fiber reinforcements, the formfitting device can have a higher strength in the longitudinal direction than transversely thereto. In this way, a high rigidity and strength can be provided, for example, along the vehicle vertical axis (z), while the formfitting device have a higher elasticity in the direction perpendicular thereto, which supports a flexible deformation of the detent element, which is advantageous for forming the form fit.

BRIEF DESCRIPTION OF THE FIGURES

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
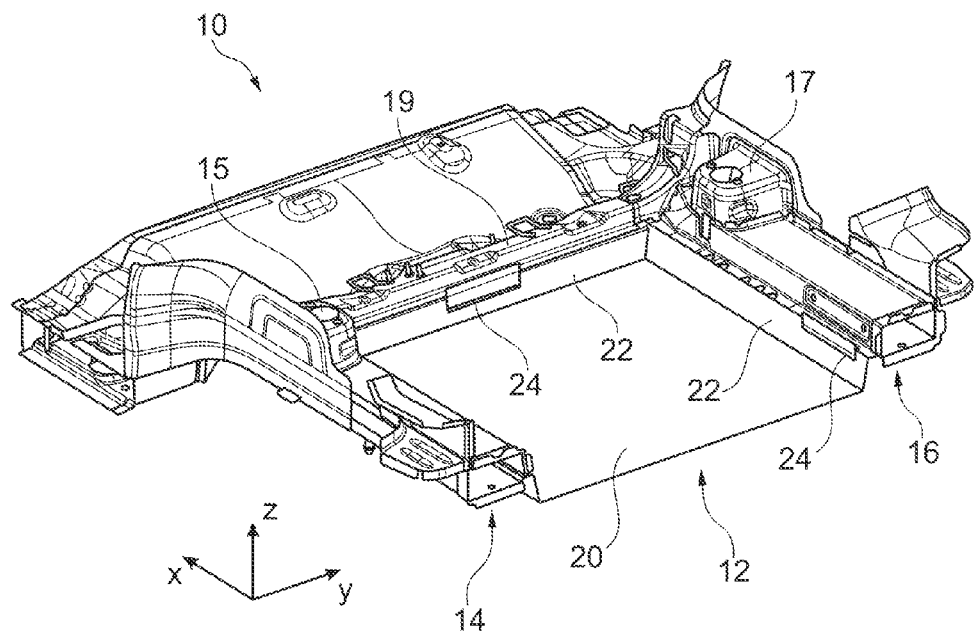
FIG. 1 shows a perspective view of a rear floor arrangement observed diagonally from the rear.

A rear floor arrangement 10 of a motor vehicle is shown in FIG. 1. The motor vehicle body, which is only shown in detail, has a left longitudinal girder 14 and a right longitudinal girder 16, which is spaced apart in the vehicle transverse direction (y). The longitudinal girders 14, 16 each protrude to the front at a spring strut suspension 15, 17. A crossbeam structure 19, via which the two longitudinal girders 14, 16 are connected to one another in the vehicle transverse direction (y), is located further to the front in the travel direction. Independently of whether the two free ends (not explicitly shown here) of the longitudinal girders 14, 16 are connected to a corresponding crossbeam structure, the area extending between crossbeam 19 and the two longitudinal girders 14, 16 is provided with a floor trough 12 made of plastic.

Figure 3:
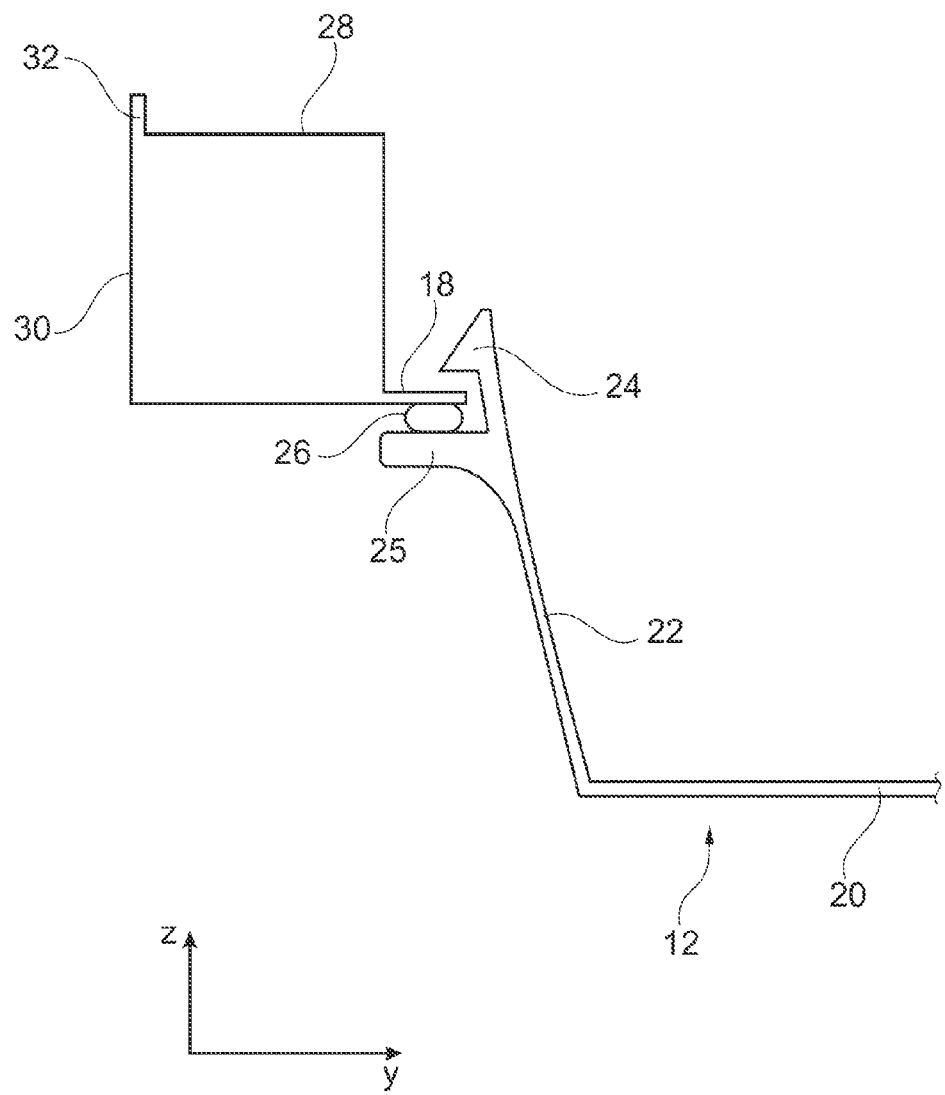
FIG. 3 shows the floor module attachment according to FIG. 2 in cross-section.

The floor trough 12 has a trough-like structure having an essentially flat floor section 20 and lateral upright wall sections 22. As shown in FIG. 3, the wall section 22 extends approximately perpendicularly to the floor section 20. The lateral wall section 22 and the floor section 20 preferably enclose an angle of approximately 90 to approximately 120° to one another.

Figure 2:
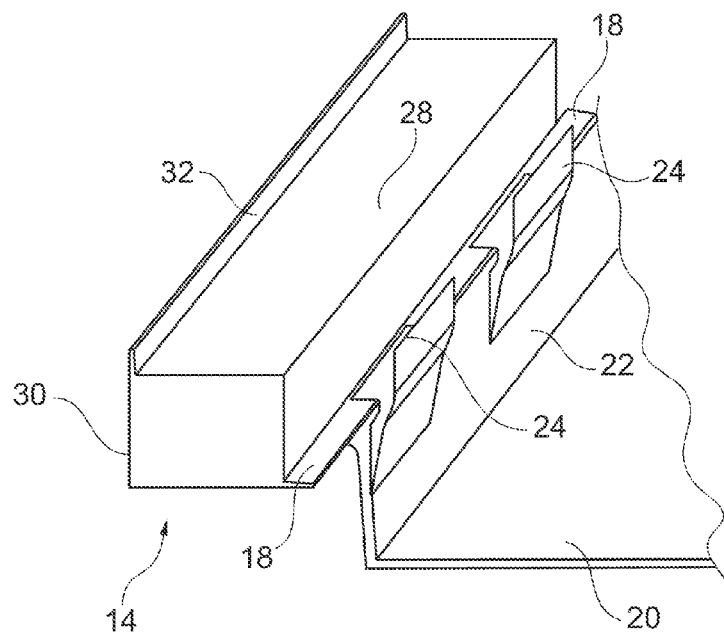
FIG. 2 shows an enlarged schematic view of the floor module attachment in the attachment area.

As is also shown in FIG. 2 and FIG. 3, the floor trough 12 has, at upwardly protruding ends of the wall sections 22, individual formfitting device 24 implemented like detent hooks and a peripheral contact flange 25 vertically spaced apart therefrom. The contact flange 25 forms a contact surface, by means of which the floor trough 12 can be connected by gluing to a corresponding counter contact surface 18 of the longitudinal girders 14, 16 by employing an adhesive 26. Contact surface 25 and detent lug 24 are implemented integrally with the floor trough 12 in this case, or integrated in its wall section 22. Thus, in a manufacturing aspect, after application of the adhesive layer to the bottom side of the counter contact surface 18 and/or to the top side of the contact surface 25, it can be moved into the provided installation position and engage by latching there by means of detent elements 24 on the flange-like inwardly protruding counter contact surface 18.

The form fit, which is achievable with the aid of the detent hooks or clips 24, can hold the floor trough 12 in its predefined installation position until the adhesive 26 is cured and connects the contact surface 25 and the counter contact surface 18, which correspond to one another and preferably extend over the entire external edge of the floor trough, in a materially-bonded and permanent manner, and with a high carrying capacity. The counter contact surface 18 is preferably implemented in extension of a bottom side of the crossbeam 14 shown in cross-section in FIG. 3. The counter contact surface 18 can particularly be formed by welding two sheet-metal shaped parts 30, 28, which form a close longitudinal girder hollow profile 14 while forming two flange sections 18, 32. With the exception of the inwardly protruding fastening flange section 18, no further separate precautions for attaching the floor module 12 are to be made on the vehicle-body-side longitudinal girders 14, 16. As shown in FIG. 1, the floor module 12 can have a comparatively oblong detent element 24 in each case on the left longitudinal girder 14, on the right longitudinal girder 16, and also in the area of the crossbeam 19. Alternatively thereto, of course, multiple detent lugs 24 arranged spaced apart from one another or similar fasteners can also be provided on each of the side edges shown of the floor module.

Figure 4:
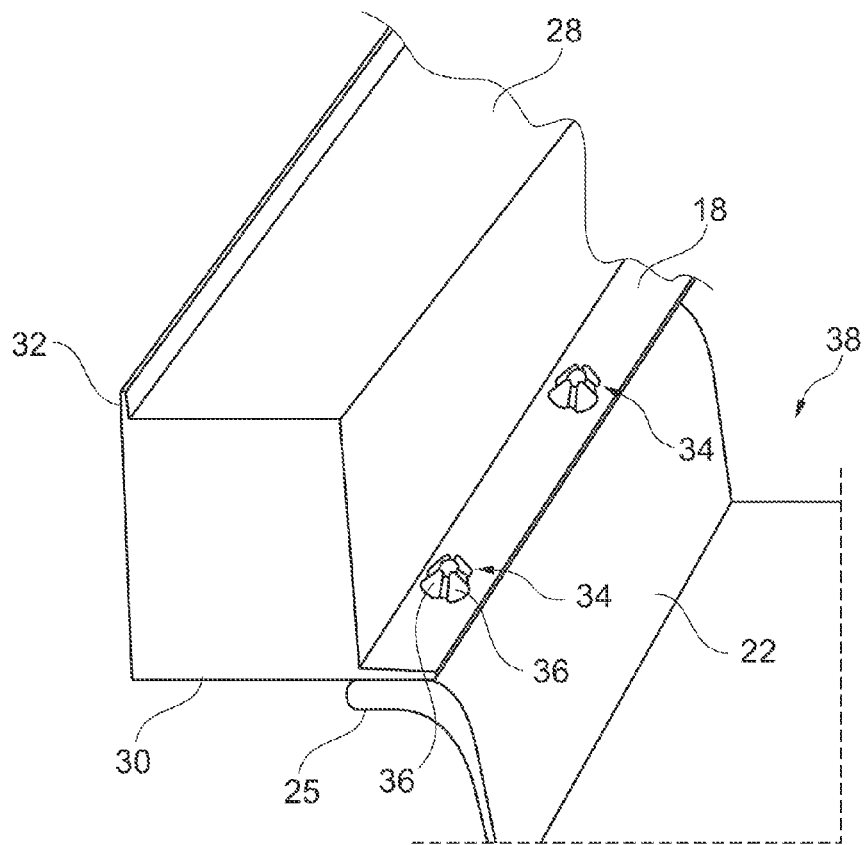
FIG. 4 shows a further embodiment of a floor module attachment.
Figure 5:
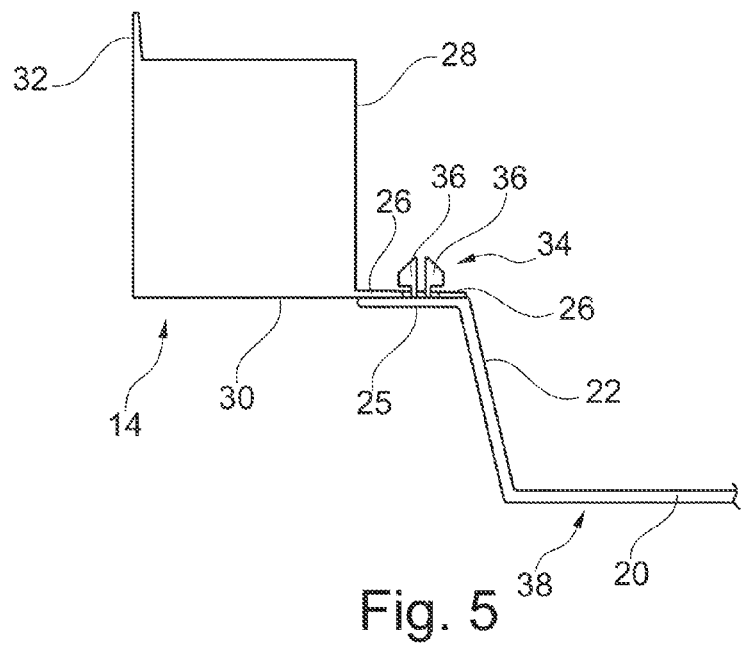
FIG. 5 shows the floor module according to FIG. 4 in cross-section.

In the design according to FIG. 4 and FIG. 5, a further possibility for forming a formfitting connection of floor module 38 and longitudinal girder 14 is shown. The longitudinal girder or its inwardly protruding attachment flange 14 is provided in this case with individual passage openings spaced apart from one another (not explicitly shown in FIG. 4 and FIG. 5), through which a detent or clip element 34, which is implemented like a mushroom-head pin or detent done, can be guided.

The pin-like formfitting device 34 has individual segments 36, which are separated from one another via one or more slots. The slots allow a deformation of the segments 36 in the radial direction. It is also advantageously provided here that the detent dome 34 is implemented as tapering toward its free end, i.e., pointing upward, in order to make insertion into corresponding passage openings of the fastening flange 18 of the longitudinal girder 14 easier. As indicated in FIG. 5, an adhesive layer 26 is provided in this case on both sides of the pin 34. In contrast to the design according to FIG. 1 to FIG. 3, in this case the side wall 22 of the floor trough 38 only has one outwardly protruding contact surface 25, which is aligned parallel to the counter contact surface 18 of the longitudinal girder 14.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A floor module for a motor vehicle having a support structure component, comprising:
    a floor trough;
    at least one contact surface in an area of at least two side edges, that is configured to support the floor trough on the support structure component; and
    at least one formfitting device shaped onto the floor trough by which the floor trough is at least temporarily fastenable on the support structure component,
    wherein the at least one formfitting device and the at least one contact surface are configured such that the at least one contact surface is provided with an adhesive reaches a contact position on the bottom side of a counter contact surface of the support structure component corresponding thereto when the at least one formfitting device provides a formfitting connection with a top side of the counter contact surface on a support structure side,
    wherein the at least one formfitting device includes a detent element and a contact flange, the contact flange forming the contact surface, wherein the detent element and the contact flange define a receiving space therebetween to receive the counter contact surface of the support structure,
    wherein the detent element includes an angled head surface and a generally horizontal underside surface such that, during installation, the counter contact surface slides along the angled head surface until captured between the horizontal underside surface of the detent element and the contact flange within the receiving space.

2. The floor module according to claim 1, wherein the at least one formfitting device is integrally implemented with a side wall of the floor trough.

3. The floor module according to claim 1, wherein the floor trough and the at least one formfitting device are formed at least partially of a plastic.

4. The floor module according to claim 1, wherein the at least one formfitting device is an extension of a side wall and protrudes from the at least one contact surface.

5. The floor module according to claim 1, wherein the detent element is a flexible detent hook.

6. The floor module according to claim 1, wherein the detent element protrudes from a plane of the at least one contact surface, and configured to penetrate a corresponding passage opening of the counter contact surface.

7. The floor module according to claim 6, wherein the detent element is a mushroom-head pin comprising a plurality of segments deformable in a radial direction.

8. The floor module according to claim 1, wherein the at least one contact surface is configured to completely enclose a side wall of the floor trough at least along three side edges.

9. The floor module according to claim 1, wherein the at least one formfitting device comprises at least one intended breakpoint.

10. The floor module according to claim 1, wherein the floor trough includes an essentially flat floor section and at least one lateral upright wall section, the lateral upright wall section extending from the floor trough and forming an interior angle of approximately 90° to approximately 120° relative to the floor trough, and wherein the at least one formfitting device is formed on the at least one lateral upright wall section.

11. The floor module according to claim 10, wherein the detent element is formed by the angled head surface, the generally horizontal underside surface, and an interior surface that is coplanar with the at least one lateral upright wall section.

12. The floor module according to claim 11, wherein the counter contact surface is horizontal, parallel to the generally horizontal underside surface of the detent element.

13. The floor module according to claim 1, wherein the at least one contact surface and the detent element each extends away from a longitudinal axis of the motor vehicle and outside of the floor trough.

14. The floor module according to claim 13, wherein the at least one contact surface extends further away from the longitudinal axis of the motor vehicle than the detent element.

15. A floor arrangement of a motor vehicle, comprising:
at least two support structure components arranged at a distance, wherein each of the at least two support structure components is a girder with a closed profile;
a floor module, comprising:
a floor trough;
at least one contact surface in an area of at least two side edges, that is configured to support the floor trough on the at least two support structure components; and
at least one formfitting device shaped onto the floor trough by which the floor trough is at least temporarily fastenable on the at least two support structure components,
wherein the floor trough is fastenable to the at least two support structure components with an adhesive provided between a contact surface on the floor trough side and a counter contact surface on a support structure side, and fixable on the at least two support structure components with the at least one formfitting device shaped onto the floor trough until at least a curing of the adhesive.

16. The floor arrangement according to claim 15, wherein the counter contact surface is a fastening flange protruding toward a vehicle center of a lateral longitudinal girder and outside of the closed profile.

17. A method for installing a floor module having a floor trough on support structure components of a motor vehicle, comprising:
applying an adhesive a contact surface of the support structure components, and
connecting the floor module in a formfitting manner to a support structure component, using at least two formfitting devices shaped onto the floor trough, until at least a curing of the adhesive, the connecting step comprising simultaneously snapping the at least two formfitting devices vertically upward onto counter contact surface flanges extending from a closed profile of the support structure components.

18. The method according to claim 17, wherein applying the adhesive comprises applying the adhesive on the floor trough side.

19. The method according to claim 17, wherein applying the adhesive comprises applying the adhesive on the counter contact surfaces.

20. The method according to claim 17, wherein the connecting the floor module comprises using the at least two formfitting devices on the support structure components until at least the curing of the adhesive.

\* \* \* \* \*